United States Patent [19]

Davies

[11] 4,189,074
[45] Feb. 19, 1980

[54] SKI CARRIER MOUNT FOR VEHICLES

[76] Inventor: David W. S. Davies, 410-668 Lakeshore Dr., Penticton, British Columbia, Canada

[21] Appl. No.: 897,407

[22] Filed: Apr. 16, 1978

[30] Foreign Application Priority Data

Apr. 21, 1977 [CA] Canada .................................. 276708

[51] Int. Cl.² ............................................ B60R 19/02
[52] U.S. Cl. .............................. 224/42.06; 224/42.13; 211/605 K
[58] Field of Search ............... 224/42.06, 42.07, 42.08, 224/42.03 R, 42.03 A, 42.12, 42.13, 42.16, 42.21, 42.45 R, 42.1 R, 29 R; 211/605 K; 248/360; 296/37.1; 280/11.37 C, 11.37 A, 11.37 E; 294/995, 103 R

[56] References Cited

U.S. PATENT DOCUMENTS

| 2,620,105 | 12/1952 | Erickson | 224/42.06 |
| 3,972,457 | 8/1976 | Kesler | 224/42.13 |
| 4,078,708 | 3/1978 | Mayer | 224/29 R |

FOREIGN PATENT DOCUMENTS 288052 3/1953 Switzerland ..................... 224/42.03 R Primary Examiner—Robert J. Spar
Assistant Examiner—Kenneth Noland
Attorney, Agent, or Firm—Fulwider, Patton, Rieber, Lee & Utecht

[57] ABSTRACT

A support member mounted on a base member for swinging movement away therefrom with a locking device for releasably securing these members together. A vertical support is connected to the support member and extends upwardly therefrom. The support member has a retaining device for retaining ends of at least one pair of skis in a substantially vertical position, and these skis are secured in the position by a securing device carried by the support near the upper end thereof. When the locking device is released, the support member can swing away from the base member to shift the skis out of the way when the base member is secured to the rear bumper of a motor vehicle.

10 Claims, 6 Drawing Figures

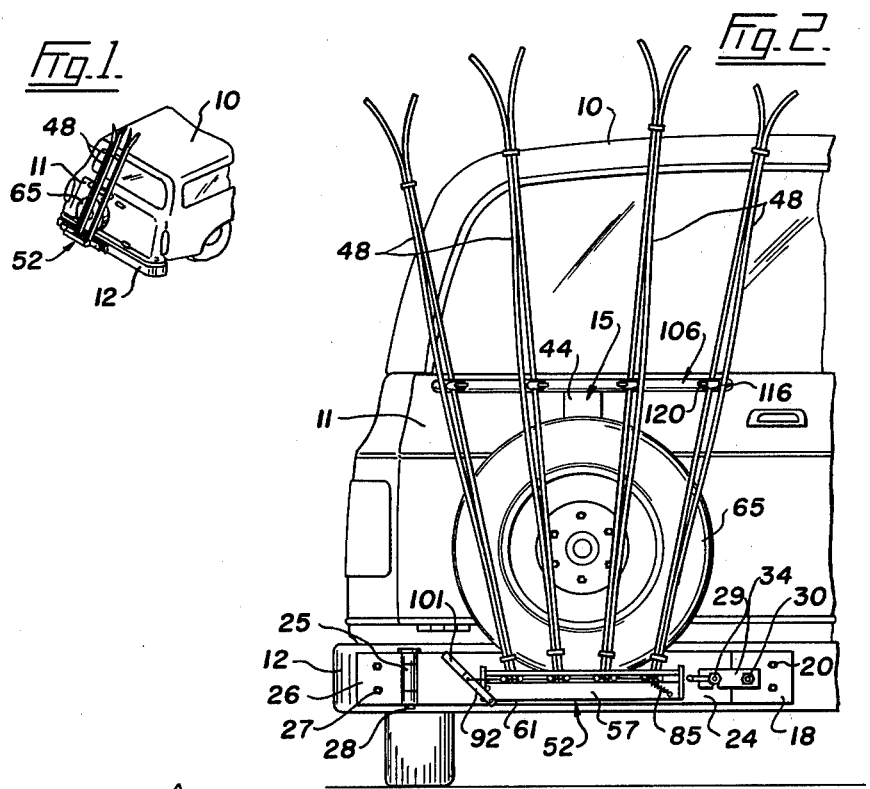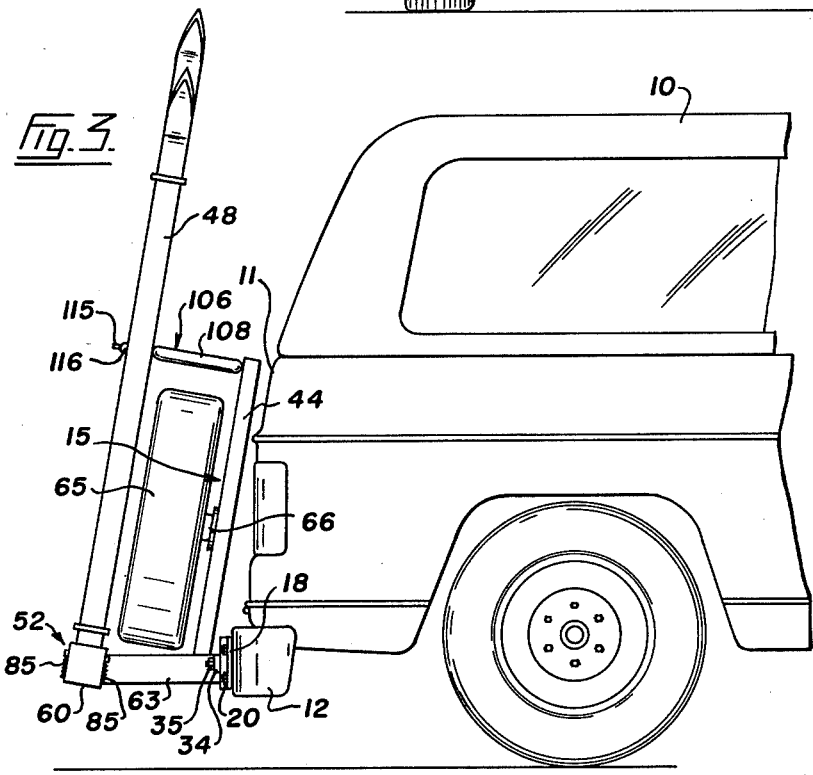

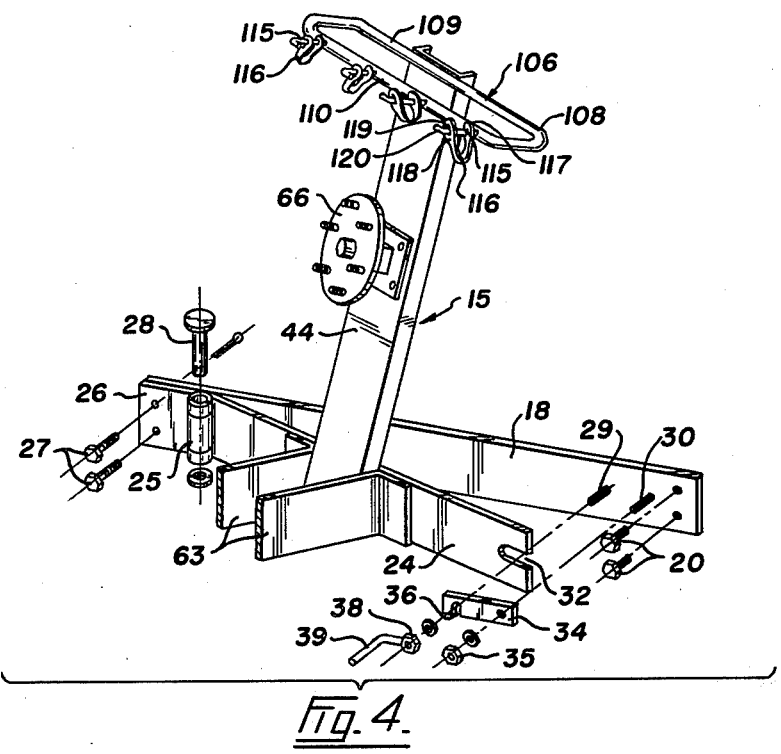
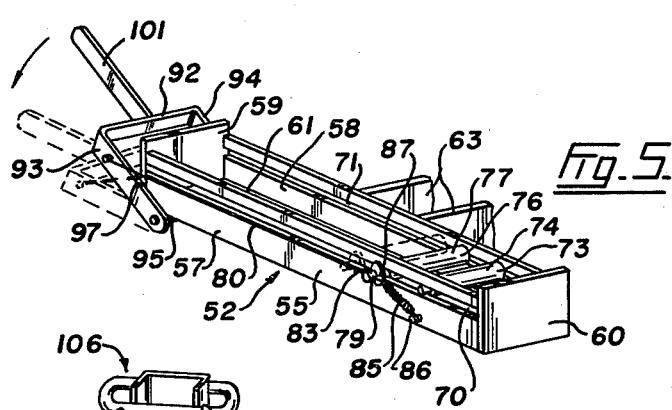
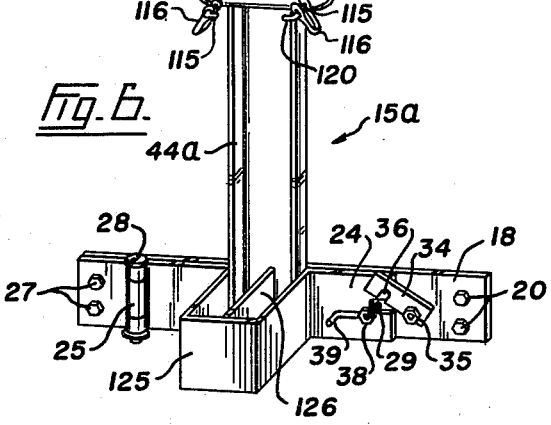

SKI CARRIER MOUNT FOR VEHICLES

This invention relates to a ski carrier mount for motor vehicles and particularly vehicles having doors or tailgates that swing rearwardly when being opened.

Many motor vehicles today have roofs that are unable to support loads either because the shape of the roof or the strength thereof. Access to roof top carriers or racks on many recreational vehicles is difficult without the use of a stepping stool since they are usually relatively high. As a result it is inconvenient to carry skis on the racks of these vehicles. Vehicles such as vans, stationwagons, panel trucks and the like have rear doors that swing outwardly, tailgates that swing outwardly or tailgates that swing outwardly and downwardly. As a result of this, it has not been possible to mount ski carriers or racks at the back of vehicles of this type.

The ski carrier mount of the present invention is such that it can be mounted on the back of any motor vehicle having doors or a tailgate that swings rearwardly to open. This unit includes a base member to be secured to a portion of the end of a motor vehicle and, preferably, the rear bumper thereof. A support member is hingedly connected at one end to this base member and is releasably secured thereto at its opposite end. The support member has means for retaining the ends of one or more pairs of skis, and a vertical support secured to the support member has at its upper end a securing means for releasbly retaining said skis in the substantially vertical position. The skis are retained in the vertical position where they do not interfere with the operation of the vehicle, and if it is desired to open the doors or tailgate thereof, the support member is released and swung outwardly away from the base member taking the skis with it. Thus, the skis are moved out of the way of the doors or tailgate.

In one form of the invention, the retaining means for the lower ends of the skis and the securing means at the upper ends of the support are spaced outwardly therefrom, and a wheel mount is secured to the support so that a spare wheel can be carried between the skis and the vertical support.

A ski carrier mount in accordance with this invention comprises a base member to be secured to the rear bumper of a motor vehicle, a support member extending parallel to the base member, hinge means connecting an end of the support member to the base member to permit the support member to swing outwardly away from the base member, locking means for releasably securing the opposite end of the support member to the base member, a vertical support connected to the support member and extending upwardly therefrom, means carried by the support member for retaining ends of at least one pair of skis in a substantially vertical position, and securing means carried by said support near the upper end thereof for releasably retaining said skis in the substantially vertical position, said support member, when said locking means is released, being swingable away from the base member to shift skis carried thereby out of the way of the doors or tailgate of said motor vehicle.

Although not absolutely necessary, it is preferable that the retaining means be in the form of clamping means for gripping the ends of the skis.

Examples of this invention are illustrated in the accompanying drawings, in which FIG. 1 is a diagrammatic perspective view of the back of a vehicle with this ski carrier mount thereon, FIG. 2 is an enlarged elevation of the ski mount supporting pairs of skis in travelling position, FIG. 3 is an end elevation of the apparatus shown in FIG. 2, FIG. 4 is a fragmentary and exploded perspective view of the mount in the partly opened position with the skis removed, FIG. 5 is an enlarged perspective view of the clamping arrangement for gripping the ends of the skis, and FIG. 6 is a perspective view of an alternative form of ski carrier mount.

Referring to FIGS. 1 to 6 of the drawings, 10 is a motor vehicle of the type having a tailgate 11 at the back thereof which swings downwardly and outwardly when it is opened. This vehicle has a rear bumper 12 mounted thereon. A ski carrier mount 15 is mounted on the back of this vehicle, and is a preferred form of mount in accordance with this invention.

The carrier mount 15 includes a base member 18 adapted to be mounted on the back of vehicle 10. It is preferably mounted on the bumper 12, but it is to be understood that the term "bumper" is intended to include any suitable portion of the rear of the vehicle below the gate 11. Base member 18 is in the form of a bar and is preferably of such length that it can be secured in position by bolts 20 which are threaded into holes which are normally in bumpers of this type. However, the bumper can be drilled and tapped to receive the bolts, if necessary, or the base member may be secured to the bumper by other suitable clamping means, not shown.

A support member 24 is swingably mounted at one end on the base member 18. In this example, the support member is in the form of a bar having a hinge 25 on one end thereof, said hinge having a plate 26 which is secured to base member 18 in any desired manner, such as by bolts 27 which extend through this plate, member 18 and are threaded into the bumper. Instead of being threaded into the bumper, the bolts 20 and 27 may have nuts threaded on inner ends thereof against the inner surface of the bumper. Hinge 25 preferably has a removable hinge pin 28.

Locking means is provided for releasably securing the free end of member 24 to member 18. In this example, threaded studs 29 and 30 are secured to member 18 and project outwardly therefrom. A slot 32 is formed in the free end of the support member and opens out from said end, as shown in FIG. 4. When member 24 is swung to its closed position lying against member 18, stud 29 extends through slot 32, while the stud 30 is clear of the end of the support member 24. A locking plate 34 is swingably mounted on stud 30 and is retained thereon by a nut 35 threaded onto the stud. Plate 34 has a slot 36 therein opening downwardly therefrom, and when bar or member 24 is in the closed position, plate 34 is swung over until stud 29, projecting through slot 32, extends into and through the locking plate slot 36. The nut 38 is threaded on stud 29.

Nut 38 may have a handle 39 secured to it and projecting from the side thereof. By means of handle 39 the nut 38 can be turned either onto or off stud 29 for quick release of the support member.

A vertical support 44 is fixedly secured at its lower end to support member 24 substantially midway between the ends thereof. The support may be in the form of a channel, as shown, and may be welded to bar 24.

Although not absolutely necessary, support 44 as preferably inclined forwardly relative to the vehicle or in the direction away from its support member 24.

The support member 24 carries means for retaining or supporting the ends of one or more pairs of skis in a substantially vertical position. In this example, mount 15 is capable of supporting four pairs of skis 48. In this example, the retaining or supporting means comprises a clamping arrangement 52 which is connected to support member 24 in any suitable manner to be carried thereby. This clamping arrangement is in the form of an open-topped box 55 having opposed side walls 57 and 58 extending longitudinally thereof, see FIG. 5. These walls extend between end walls 59 and 60 which project upwardly from the bottom 61 of the box. The box side walls and bottom may be in the form of a channel having the walls 59 and 60 secured to ends thereof in any suitable manner, such as by welding. In this example, box 55 is secured to and spaced outwardly from support member 24 by spacer bars 63, these bars extend horizontally between the support member and the box and are secured thereto at their opposite ends in any convenient way, such as by welding. The clamping box is spaced outwardly from the support member in this example so that a spare wheel 65 may be retained in the space between the skis and vertical support 44 by a wheel mount 66 secured to the support a sufficient distance above bar 24 to enable the tire of the spare wheel to clear spacer 63, as shown in FIG. 3.

A preferred form of clamp is provided at box 55. The side walls 57 and 58 have opposed slots 70 and 71 therein and extending longitudinally thereof. A plurality of stationary bars 73 extend transversely of the box and are secured thereto at the level of slots 70, 71 by welding or the like. Each bar is preferably in the form of a rod having a cover 74 wrapped therearound, said cover being formed of rubber or suitable resilient plastic material. Opposed to each bar or rod 73 is a movable bar or rod 76 which extends through and is slidable in the slots 70, 71. This bar or rod preferably has a resilient cover 77 thereon similar to cover 74. In this example, there are four pairs of bars 73, 76, one pair for each pair of skis. However, for the sake of clarity, only one pair of bars 73, 76 are shown in FIG. 5.

The moveable bars 76 are preferably interconnected for movement together, and in this example, the ends of each bar have horizontal holes 79 extending therethrough and through which a cable 80 extends. Each bar 76 is fixedly and adjustably secured to the cable in any convenient manner such as by means of set screws 83 which are threaded through the bar ends and are turnable to grip or release cables 80.

Suitable means is provided for biasing the bars 76 towards their respective opposed stationary bars 73, and this is preferably in the form of coil springs 85 secured at ends 86 thereof to the adjacent box walls. The opposite ends 87 of these springs are secured to the bar 76 at the right end of box 55 when viewed from the rear as in FIG. 2. There may be a pair of springs 85 connected to each of the bars 76, but it has been found that one pair of springs connected to the adjacent bar 76, as shown, functions satisfactorily.

Shifting means is connected to the moveable bars 76, said shifting means being operable to move these bars away from their respective stationary bars 73. The illustrated shifting means comprises a yoke 92 having ends 93 and 94 which overlap the side wall 57 and 58 at one end of box 55. Pins 95 project laterally from the end of the box near the bottom thereof, and yoke arms 93 and 94 are swingably mounted on these pins. The outer ends of cables 80 are secured to the arms 93 and 94, and springs 85 normally maintain a pull on cables 80 so that the yoke arms are normally in an upwardly inclined position as shown in FIG. 5. The swinging movement of the yoke towards the box at this time is limited by stops 97 projecting from the end of the box near and above the level of pins 95. Thus, springs 85 retain the arms of the yoke against stops 97 with the bar 76 near or touching bar 73 in a gripping position, see FIG. 5. A handle 101 projects outwardly from the back of yoke 92, and this yoke may be swung around pins 95 away from stops 97 to shift bar 76 away from bar 73, as shown in broken lines in FIG. 5, in a release position.

Securing means is provided at the top of support 44 for releasably retaining the skis in the substantially vertical position. This securing means is in the form of a rack 106 mounted on the upper end of the vertical support. The illustrated rack is in the form of a tube 108 bent into an elongated loop having an inner side 109 secured to the support, and an outer side 110 spaced outwardly from said inner side, see FIG. 4. A plurality of posts 115 are threaded at inner ends thereof in the outer side 110 of rack 106, there being one post for each pair of skis to be carried. A resilient strap 116 for each post is looped from an inner end 117 secured to the inner end of the post and an outer end 118 having a slot 119 formed therein through which post 115 can extend. The outer end 120 of the post is bent at an angle to the main part thereof. This bent end normally prevents the end 118 of the loop strap 116 from coming off its post 115.

When it is desired to mount one or more pairs of skis in carrier mount 15, yoke 92 is swung downwardly to draw the clamping bars 76 away from their respective adjacent bars 73 out of the gripping position and into the release position. At this time, the ends of skis 48 can be inserted between the adjacent pairs of clamping bars. When yoke 92 is released, springs 85 shift the bars 76 to clamp the ski ends against the adjacent bars 73. Following this, the outer end of a loop strap 116 for each pair of skis is removed from its post 115. The pair of skis is moved against the outer side 110 of rack 106, and then strap 116 is pulled around the skis and fitted over the outer end of post 115 to hold the skis firmly against the latter.

Support member 24 is normally retained in position by the locking plate 34, at which time the skis extend upwardly behind vehicle 10, as clearly shown in FIGS. 2 and 3. If it is desired to open the tail gate 11 of the vehicle, nut 38 is turned off stud 29 so that member 24 can be swung away from base member 18 and around until the vertical support and the skis carried by the mount are clear of the rear of the vehicle. When the tail gate is returned to its normal position, bar 24 is swung back and locking plate 34 replaced, following which nut 38 is turned on stud 29 to lock these elements together.

If mount 15 is not required, support member 24 and the elements carried thereby can be removed merely by withdrawing pin 28 from its hinge 25.

FIG. 6 illustrates an alternative ski carrier mount 15a in accordance with this invention. The base member 18, support member 24, and rack 106 are the same as in mount 15, excepting that this rack is a little smaller than the previously described one. Vertical support 44a is of channel formation and opens rearwardly instead of forwardly as does the channel 44. However, mount 15a does not have a space for a spare wheel 65, and a box 125 having a central partition 126 therein is mounted directly on support member 24 at the base of vertical support 44a. The illustrated box 125 does not include the clamping arrangement described above, but it can be made in the same manner as box 55 with these clamping elements in it, if desired.

The ski carrier mount 15a of FIG. 6 operates in the same manner as mount 15, except that it does not clamp the ends of the skis in box 125, there is no space for a tire mount, and it is designed to carry only two pairs of skis. When only one pair of skis is being carried, the partition 126 prevents the lower ends thereof from shifting in box 125.

I claim:

1. A ski carrier mount to be secured to the back of motor vehicles having doors or tail gates that swing rearwardly when being opened, said mount comprising a base member to be secured to the rear bumper of a motor vehicle, a support member extending parallel to the base member, hinge means connecting an end of the support member to the base member to permit the support member to swing outwardly away from the base member, locking means for releasably securing the opposite end of the support member to the base member, a vertical support connected to the support member and extending upwardly therefrom, a spacer secured to the support member and extending outwardly therefrom substantially perpendicular thereto, means carried by said spacer for retaining ends of at least one pair of skis in a substantially vertical position, a rack secured to said vertical support near the upper end thereof and extending outwardly therefrom substantially perpendicular thereto, a tire carrier mounted on the vertical support and positioned to carry a spare wheel, said spacer and said rack extending outwardly sufficiently to permit a tire and wheel to be supported between said skis and said vertical support securing means carried by said rack for releasably retaining said skis in the substantially vertical position, said support member, when said locking means is released, being swingable away from the base member to shift skis carried thereby out of the way of the doors or tail gate of said motor vehicle.

2. A carrier mount as claimed in claim 1 in which said retaining means comprises clamping means for gripping the ends of said skis.

3. A carrier mount as claim in claim 1 or 2 in which said upper end of said vertical support is inclined forwardly of said motor vehicle.

4. A ski carrier mount to be secured to the backs of motor vehicles having doors or tail gates that swing rearwardly when being opened, said mount comprising a base member to be secured to the rear bumper of a motor vehicle, a support member extending parallel to the base member, means connecting an end of the support member to the base member to permit the support member to be moved away from the base member, locking means for releasably securing the support member to the base member, a vertical support connected to the support member and extending upwardly therefrom, retaining means carried by the support member for retaining ends of at least one pair of skis in a substantially vertical position, said retaining means comprising an open-topped box extending longitudinally of the support member and secured thereto, said box having side walls extending longitudinally thereof, a plurality of stationary bars extending across the box and secured to the side walls thereof, a movable bar adjacent each stationary bar and mounted on said side walls for movement towards and away from the adjacent stationary bar, biasing means connected to each movable bar and biasing said movable bars towards the adjacent stationary bars and into a gripping position with the ends of said at least one pair of skis, and shifting means connected to each movable bar and operable to shift the movable bars out of the gripping position, and securing means carried by said support near the upper end thereof for releasably retaining said skis in the substantially vertical position, said support member, when said locking means is released, being movable away from the base member to shift skis carried thereby out of the way of the doors or tail gate of said motor vehicle.

5. A ski carrier mount to be secured to the backs of motor vehicles having doors or tail gates that swing rearwardly when being opened, said mount comprising a base member to be secured to the rear bumper of a motor vehicle, a support member extending parallel to the base member, means connecting an end of the support member to the base member to permit the support member to be moved away from the base member, locking means for releasably securing the support member to the base member, a vertical support connected to the support member and extending upwardly therefrom, retaining means carried by the support member for retaining ends of at least one pair of skis in a substantially vertical position, said retaining means comprising an open-topped box extending longitudinally of the support member and secured thereto, said box having side walls extending longitudinally thereof, a plurality of stationary bars extending across the box and secured to the side walls thereof, said side walls having opposed slots therein extending longitudinally of the box, a movable bar adjacent each stationary bar and having ends slidable in said slots, connecting means interconnecting the movable bars to cause said bars to move in unison, biasing means connected to the movable bars biasing said movable bars towards the respective adjacent stationary bars into a gripping position with the ends of said at least one pair of skis, and shifting means secured to said connecting means and operable to shift the movable bars out of the gripping position, and securing means carried by said support near the upper end thereof for releasably retaining said skis in the substantially vertical position, said support member, when said locking means is released, being movable away from the base member to shift skis carried thereby out of the way of the doors or tail gate of said motor vehicle.

6. A ski carrier mount to be secured to the backs of vehicles having doors or tail gates that swing rearwardly when being opened, said mount comprising a base member to be secured to the rear bumper of a motor vehicle, a support member extending parallel to the base member, means connecting an end of the support member to the base member to permit the support member to be moved away from the base member, locking means for releasably securing the support member to the base member, a vertical support connected to the support member and extending upwardly therefrom, retaining means carried by the support member for retaining ends of at least one pair of skis in a substantially vertical position, said retaining means comprising an open-topped box extending longitudinally of the support member and secured thereto, said box having side walls extending longitudinally thereof, a plurality of stationary bars extending across the box and secured to the side walls thereof, said side walls having opposed slots therein extending longitudinally of the box, a movable bar adjacent each stationary bar and having ends slidable in and protruding outwardly through said slots, cables extending along the box outside the side walls thereof and connected to the protruding ends of the movable bars, biasing means connected to the protruding ends of at least one of the movable bars biasing the movable bars towards the respective adjacent stationary bars, and shifting means secured to said cables and operable to shift the movable bars out of the gripping position with the ends of said at least one pair of skis, and securing means carried by said support near the upper end thereof for releasably retaining said skis in the substantially vertical position, said support member, when said locking means is released, being movable away from the base member to shift skis carried thereby out of the way of the doors or tail gate of said motor vehicle.

7. A ski carrier mount to be secured to the backs of motor vehicles having doors or tail gates that swing rearwardly when being opened, said mount comprising a base member to be secured to the rear bumper of a motor vehicle, a support member extending parallel to the base member, means connecting an end of the support member to the base member to permit the support member to be moved away from the base member, locking means for releasably securing the support member to the base member, a vertical support connected to the support member and extending upwardly therefrom, retaining means carried by the support member for retaining ends of at least one pair of skis in a substantially vertical position, said retaining means comprising an open-topped box extending longitudinally of the support member and secured thereto, said box having side walls extending longitudinally thereof, a plurality of stationary bars extending across the box and secured to the side walls thereof, said side walls having opposed slots therein extending longitudinally of the box, a movable bar adjacent each stationary bar and having ends slidable in and protruding outwardly through said slots, cables extending along the box outside the side walls thereof and connected to the protruding ends of the movable bars, biasing means connected to the protruding ends of at least one of the movable bars biasing the movable bars towards the respective adjacent stationary bars and into gripping positions with the ends of said at least one pair of skis, a yoke swingably mounted on the box adjacent an end thereof for swinging movement around a pivot carried by the box, said cables being connected to the yoke, and stop means on the box adjacent the yoke for limiting the pivoting motion of said yoke under the action of said biasing means, said yoke being swingable around said pivot means and away from said stop means to shift the movable bars away from the stationary bars out of the gripping position, and securing means carried by said support near the upper end thereof for releasably retaining said skis in the substantially vertical position, said support member, when said locking means is released, being movable away from the base member to shift skis carried thereby out of the way of the doors or tail gate of said motor vehicle.

8. A ski carrier mount to be secured to the backs of motor vehicles having doors or tail gates that swing rearwardly when being opened, said mount comprising a base member to be secured to the rear bumper of a motor vehicle, a support member extending parallel to the base member, means connecting an end of the support member to the base member to permit the support member to be moved away from the base member, locking means for releasably securing the support member to the base member, a vertical support connected to the support member and extending upwardly therefrom, retaining means carried by the support member for retaining ends of at least one pair of skis in a substantially vertical position, said retaining means comprising an open-topped box extending longitudinally of the support member and secured thereto, said box having side walls extending longitudinally thereof, a plurality of stationary bars extending across the box secured to the side walls thereof, said side walls having opposed slots therein extending longitudinally of the box, a movable bar adjacent each stationary bar and having ends slidable in and protruding outwardly through said slots, cables extending along the box outside the side walls thereof and connected to the protruding ends of the movable bars, biasing means connected to the protruding ends of at least one of the movable bars biasing the movable bars towards the respective adjacent stationary bars and into a gripping position with the ends of said at least one pair of skis, pivot pins projecting outwardly from the opposite sides of the box adjacent an end thereof, a yoke having arms swingably mounted on said pins, said cables being connected to the arms of the yoke, stops mounted on said side walls above said pins, the arms of said yoke engaging the stops under the action of the biasing means, said yoke being swingable around said pins away from said stops to shift the movable bars away from the stationary bars out of the gripping position, and securing means carried by said support near the upper end thereof for releasably retaining said skis in the substantially vertical position, said support member, when said locking means is released, being movable away from the base member to shift skis carried thereby out of the way of the doors or tail gates of said motor vehicle.

9. A ski carrier mount to be secured to the backs of motor vehicles having doors or tail gates that swing rearwardly when being opened, said mount comprising a base member to be secured to the rear bumper of a motor vehicle, a support member extending parallel to the base member, means connecting an end of the support member to the base member to permit the support member to be moved away from the base member, locking means for releasably securing the support member to the base member, a vertical support connected to the support member and extending upwardly therefrom, retaining means carried by the support member for retaining ends of at least one pair of skis in a substantially vertical position, said retaining means comprising an open-topped box extending longitudinally of the support member and secured thereto, said box having side walls extending longitudinally thereof, a plurality of stationary bars extending across the box and secured to the side walls thereof, said side walls having opposed slots therein and each stationary bar having ends slidable in and protruding outwardly through said slots, cables extending along the box outside the walls thereof, means releasably connecting the protruding ends of the movable bars to the cables, biasing means connecting the protruding ends of at least one of the movable bars biasing the movable bars towards the respective adjacent stationary bars into gripping positions with the ends of said at least one pair of skis, a yoke swingably mounted on the box adjacent an end thereof for swinging movement around a pivot carried by the box, said cables being connected to the yoke, and stop means on the box adjacent the yoke for limiting the pivoting motion of said yoke under the action of the biasing means, said yoke being swingable around said pivot means and away from said stop means to shift the movable bars away from the stationary bars out of the gripping position, and securing means carried by said support near the upper end thereof for releasably retaining said skis in the substantially vertical position, said support member, when said locking means is released, being movable away from the base member to shift skis carried thereby out of the way of the doors or tail gate of said motor vehicle.

10. A ski carrier mount to be secured to the backs of motor vehicles having doors or tail gates that swing rearwardly when being opened, said mount comprising a base member to be secured to the rear bumper of a motor vehicle, a support member extending parallel to the base member, means connecting an end of the support member to the base member to permit the support member to be moved away from the base member, locking means for releasably securing the support member to the base member, a vertical support connected to the support member and extending upwardly therefrom, retaining means carried by the support member for retaining ends of at least one pair of skis in a substantially vertical position, said retaining means comprising an open-topped box extending longitudinally of the support member and secured thereto, said box having side walls extending longitudinally thereof, a plurality of stationary bars extending across the box and secured to the side walls thereof, said side walls having opposed slots therein and each stationary bar having ends slidable in and protruding outwardly through said slots, cables extending along the box outside the walls thereof, means releasably connecting the protruding ends of the movable bars to the cables, biasing means connecting the protruding ends of at least one of the movable bars biasing the movable bars towards the respective adjacent stationary bars and into a gripping position with the ends of said at least one pair of skis, pivot pins projecting outwardly from the opposite sides of the box adjacent an end thereof, a yoke having arms swingably mounted on said pins, said cables being connected to the arms of the yoke, stops mounted on said side wall above said pins, the arms of said yoke engaging the stops under the action of the biasing means, said yoke being swingable around said pins away from said stops to shift the movable bars away from the stationary bars out of the gripping position, and securing means carried by said support near the upper end thereof for releasably retaining said skis in the substantially vertical position, said support member, when said locking means is released, being movable away from the base member to shift skis carried thereby out of the way of the doors or tail gate of said motor vehicle.

* * * * *